US008171014B2

(12) United States Patent
Adler et al.

(10) Patent No.: US 8,171,014 B2
(45) Date of Patent: *May 1, 2012

(54) APPARATUS, SYSTEM, AND METHOD FOR EXECUTING A DISTRIBUTED SPATIAL DATA QUERY

(75) Inventors: David W. Adler, Mount Tremper, NY (US); Fain Butt, Milpitas, CA (US); Alvin K. Cho, San Jose, CA (US); Tian Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 893 days.

This patent is subject to a terminal disclaimer.

(21) Appl. No.: 11/847,269

(22) Filed: Aug. 29, 2007

(65) Prior Publication Data

US 2009/0063524 A1   Mar. 5, 2009

(51) Int. Cl.
*G06F 7/00* (2006.01)
(52) U.S. Cl. ...................................................... 707/713
(58) Field of Classification Search ........... 707/999.101, 707/713
See application file for complete search history.

(56) References Cited

U.S. PATENT DOCUMENTS

| | | | |
|---|---|---|---|
| 2003/0154189 A1 | 8/2003 | Egilsson et al. | 707/1 |
| 2007/0016565 A1 | 1/2007 | Evans et al. | 707/3 |
| 2007/0050340 A1 | 3/2007 | von Kaenel et al. | 707/3 |

OTHER PUBLICATIONS 16.3.2. Well-Known Binary (WKB) Format, MySQL AB, 2007.
Papadias et al., "Query in Processing in Spatial Network Databases", Proceedings of the 29th VLDB Conference, 2003.
Mattos et al., "Integrating Spatial Data with Business Data", DB2 Magazine Quarter 1, 1998.
Tan et al., "Exploiting Spatial Indexes for Semijoin-based Join Processing in Distributed Spatial Databases", IEEE Transactions on Knowledge and Data Engineering, v 12, n 6, Nov.-Dec. 2000.
Kang et al., "A Parallel Spatial Join Processing for Distributed Spatial Databases (on Order)", Flexible Query Answering Systems 5th International Conference, FQAS, Oct. 27-29, 2002.
Abel et al., "Spatial join strategies in distributed spatial DBMS", Advances in Spatial Databases. 4th International Symposium, Aug. 6-9, 1995.
"IBM DB2 Spatial Extender", Highlights, IBM DB2 Information Management Software, 2004.
"Administration Guide for Federated Systems", WebSphere Information Integration IBM, Version 9, no date available but copyright 1998, 2006.

(Continued)

*Primary Examiner* — Wilson Lee
*Assistant Examiner* — Michael Le
(74) *Attorney, Agent, or Firm* — Kunzler Needham Massey & Thorpe (57) ABSTRACT

A method for executing a distributed spatial data query. The present invention allows a client to perform spatial queries against spatial data stored in a various formats in various separate databases. A view of the data is created in the relevant databases, wherein the spatial data is converted to WKB and stored as a BLOB. A federated server contains nicknames for the various database views, and also contains views of the data where the BLOB is converted back to a spatial data type. The federated server presents to clients an application view of the distributed heterogeneous spatial data such that the clients can treat the data as if it were a homogenous data source. Also taught is incorporating distributed non-spatial data into the application view by creating a nickname and a view on top of the nickname which derives spatial information from the non-spatial location information.

14 Claims, 6 Drawing Sheets

OTHER PUBLICATIONS

IBM, "WebSphere Information Integration-Administration Guide for Federated Systems;" Version 9; Aug. 25, 2006, 374 pages.

IBM, "DB2 Spatial Extender-User's Guide and Reference;" Version 7; Jun. 2001, 373 pages.

Received Non-Final Office Action U.S. Appl. No. 11/847,272; Sep. 7, 2010, 23 pages.

IBM Customer Success, San Franciso maps city services with IBM DB2 and DB2 Spatial Extender, Data Management Software, Jun. 2002, 4 pages.

APPARATUS, SYSTEM, AND METHOD FOR EXECUTING A DISTRIBUTED SPATIAL DATA QUERY

CROSS-REFERENCE TO RELATED APPLICATIONS

The commonly-assigned patent application Ser. No. 11/847,272, entitled "Apparatus, System, and Method for Executing a Distributed Spatial Data Query", filed on Aug. 29, 2007 by Adler et al., is related to this application.

BACKGROUND OF THE INVENTION

1. Field of the Invention

This invention relates to executing a distributed spatial data query. More specifically, the invention relates to creating a homogenous, uniform data spatial source from distributed, heterogeneous spatial and non-spatial data sources and executing a spatial data query in such an environment.

2. Description of the Related Art

Spatial data (or, as it is sometimes known, geoinformation) is data which provides real world position information. In many instances, it is one piece of data in a set related to a particular object. For example, a restaurant object may include data concerning the restaurant name, type of food served, menu, and hours of operation. It may additionally contain spatial data which indicates its position relative to other objects in a real spatial world. Spatial data may include point data (for example, the restaurant may be represented as a point), line data (e.g., a highway or street), polygon data (e.g., a lake or a park), or others. Spatial data constitutes a distinct data type which can be the object of, and result from, spatial functions and predicates.

A spatial database is capable of storing and understanding spatial data and also providing a user with information concerning how different spatial objects relate to one another; for example, typical database functions allow a user to determine the distance between two points, determine the area of a polygon object, create new spatial objects, and make true or false type queries concerning the data (e.g., is there a residence for sale within one mile of my workplace?).

The importance of spatial data and effective methods for providing spatial information to clients is continuing to grow. Services providing users with spatial information rely heavily on the ability of a user to interact with the data, often in the form of queries. A client may want to know how many Chinese restaurants are within a 1 mile radius of a current location. As services making use of spatial data grow, the need to provide effective, quick answers to queries also grows.

In many instances, the spatial data is not located in a single database; rather, it is located in a number of different databases which are not necessarily of the same type. This poses a significant problem to an entity which wants to provide clients with a service that requires access to data from various data sources. For example, a real estate service may wish to provide clients with information about homes listed in a particular city and also provide relevant information such as the proximity of schools, school district information, and the proximity of registered sex offenders. However, the real estate listings may be stored as spatial information in an Oracle database, the school information as spatial information in a Sybase database, and the sex offender registry as a flat file which contains addresses, but does not have a computer-recognizable spatial data type within it.

Building a solution that allows a client to access these three data sources and use them to run searches presents a problem. One possible solution is to extract, transform, and load (ETL) the data into a single spatial database and then allow the client to run queries against the single database. This, however, creates a number of problems. First, ETL wastes resources; the solution requires storing locally information that is already stored elsewhere. This process of storing the same information again also creates a significant processing burden on the database, a process which repeats itself with each necessary update to the consolidated database. In addition, the data becomes stale as time passes—because the consolidated database does not reflect the real-time status of the data in the source databases, as time passes the likelihood that the data is no longer correct increases. Finally, extracting, transforming, and loading data is not a trivial task, particularly where the data is stored in distributed, heterogeneous databases.

SUMMARY OF THE INVENTION

Applicants submit that there exists a need for an apparatus, system, and method for enabling the execution of a distributed spatial data query. Ideally, the solution should not require the storage or computing resources of ETL. In addition, the solution should be implemented at the database layer, as opposed to the application layer, to facilitate faster data transactions and to isolate the application from the physical data model. The solution should also provide a dynamic solution where the components are built at run-time in order to ensure that the data is current and quickly retrieved. In addition, the solution should be able to handle cases where the data source comprises spatial data and where the data source comprises non-spatial data but provides some form of location information, such as a text address.

The present invention has been developed in response to the present state of the art, and in particular, in response to the problems and needs in the art that have not yet been fully solved. Accordingly, the present invention has been developed to provide an apparatus, system, and method for executing a distributed spatial data query.

The present invention comprises a computer program product comprising a computer useable medium having a computer-readable program for executing a spatial data query in a distributed heterogeneous data source environment. The operations of the computer program product comprises creating a database view in a database, where the view comprises spatial data from a table in the database, and the spatial data is represented in the view in well-known binary (WKB) format as a binary large object (BLOB) data type. The operations further comprise creating a nickname for the database view in a federated server and creating a remote data source view of the nickname in the federated server, the remote data source view comprising spatial data derived from the BLOB. In addition, the operations further comprise joining one or more remote data source views into a composite view, the composite view defining an application view of the data.

In one embodiment, creating the database view in the database comprises applying a propriety database conversion function to convert spatial data in proprietary form into WKB. In one embodiment, converting WKB data into spatial data further comprises invoking a DB2GSE.ST_GeomFromWKB function. Spatial data derived from WKB may be represented as a DB2 spatial type.

Creating a nickname for the database view may further comprise creating a wrapper object, creating a server object, defining user mapping, and assigning a nickname.

The operations may further comprise creating a nickname in the federated server for a remote data source comprising non-spatial location information, and creating a remote data source view of the nickname in the federated server, where the server view comprises spatial data derived from the non-spatial location information. In such an embodiment, creating the remote data source view of the nickname in the federated server may further comprise converting non-spatial location information to spatial data. In addition, converting non-spatial location information to spatial data may comprise invoking a spatial function of DB2 Spatial Extender.

Further disclosed is a computer program product comprising a computer-useable medium having a computer-readable program for executing a spatial data query in a distributed heterogeneous data source environment where the operations comprise receiving a database request from a client, wherein a database table associated with the database request comprises a spatial column. The operations further comprise invoking a function to convert the spatial data in the spatial column, the spatial data represented in spatial format, to well-known binary (WKB) data as a binary large object (BLOB) data type and invoking a function to convert the WKB data to spatial data represented in a spatial format, the WKB data in a BLOB column for the database view, the database view identified by a nickname in a federated server and the converted spatial data defined by a remote data source view. The operations additionally comprise returning to the client the results of the database request, the spatial data associated with the database request in spatial format.

In certain embodiments, the remote data source view is associated with each nickname. In other embodiments, the operations comprise executing a spatial join of one or more remote data source views, the view resulting from the spatial join defining an application view.

The operations may additionally comprise the database request requesting spatial data from the remote data source view, the remote data source view requesting spatial data from the nickname, the nickname requesting BLOB data from the database view, and the database view requesting spatial data from the database table.

In addition, the database request from the client may reference a data source comprising non-spatial location information. In such an embodiment, the operations may further comprise invoking a function to convert the non-spatial location information referenced by the nickname to spatial data, such that the remote data source view comprises a spatial column of non-spatial location information as spatial data, and returning to the client the results of the database request, the non-spatial location information associated with the database request referencing spatial data. In certain embodiments, the function to operate on the non-spatial location information is a geocoding function and the non-spatial location information is textual address data.

In certain embodiments, the data source comprising non-spatial location information is a table in a database. The data source comprising non-spatial location information may also be a derived data source.

Also disclosed is a system for supporting spatial query in a distributed heterogeneous data source environment, where the system comprises a processor and memory. The system may further comprise one or more databases which comprise a table of spatial data comprising at least one column having a spatial data type, and a view of the table comprising the at least one column of spatial data converted to well-known binary (WKB) format and stored as a binary large object (BLOB) data type.

The system further comprises a federated server having a set of spatial data support libraries. The federated server comprises one or more nicknames each mapping to a view in a heterogeneous data source, one or more remote data source views that reference one or more of the nicknames, wherein each remote data source view comprises a column of spatial data derived from the BLOB, and a composite application view comprising a join of one or more remote data source views, the composite application view presenting a uniform data source to one or more clients.

The system may further comprise one or more clients submitting database requests to run against the composite application view. In addition, the system may further comprise one or more data sources with non-spatial location information. In such an embodiment, the federated server may additionally comprise one or more nicknames, each mapping to a set of data comprising non-spatial location information, and a view that references one or more of the nicknames, the view comprising spatial data derived from the non-spatial location information. In such an embodiment, the set of spatial support libraries comprises one or more functions which derive spatial point information from the non-spatial location information.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as a processor and memory device, field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code lines, among different programs, and across several memory devices. Similarly, operational data may be identified and illustrated herein within modules and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware processors and memory, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

In addition, the specification and claims make reference to a computer-implemented process. A computer-implemented process refers to a series of executable instructions performed by a computer. It is understood that software constitutes one embodiment of a computer-implemented process. The specification and claims further make reference to encoding sets of computer instructions onto computer-readable medium. Encoding a set of computer instructions onto computer-readable medium refers to the storage of computer instructions onto a computer-readable medium. Encoding computer instructions onto computer-readable medium includes, for example, direct copying of the object code. It further includes copying source code for local compilation. Encoding a set of computer instructions onto a computer readable medium includes, for example, storing computer instructions on a remote client where the computer instructions are sent from a server to the remote client over the internet.

Computer-readable medium encompasses a variety of medium, such as hard-disk drives and other devices built into computers, and also removable media such as compact discs and flash memory storage modules. Those of skill in the art will recognize, of course, that the above constitute only a few examples of computer-readable medium, and that the examples given are not intended to act as limitations.

Figure 1:
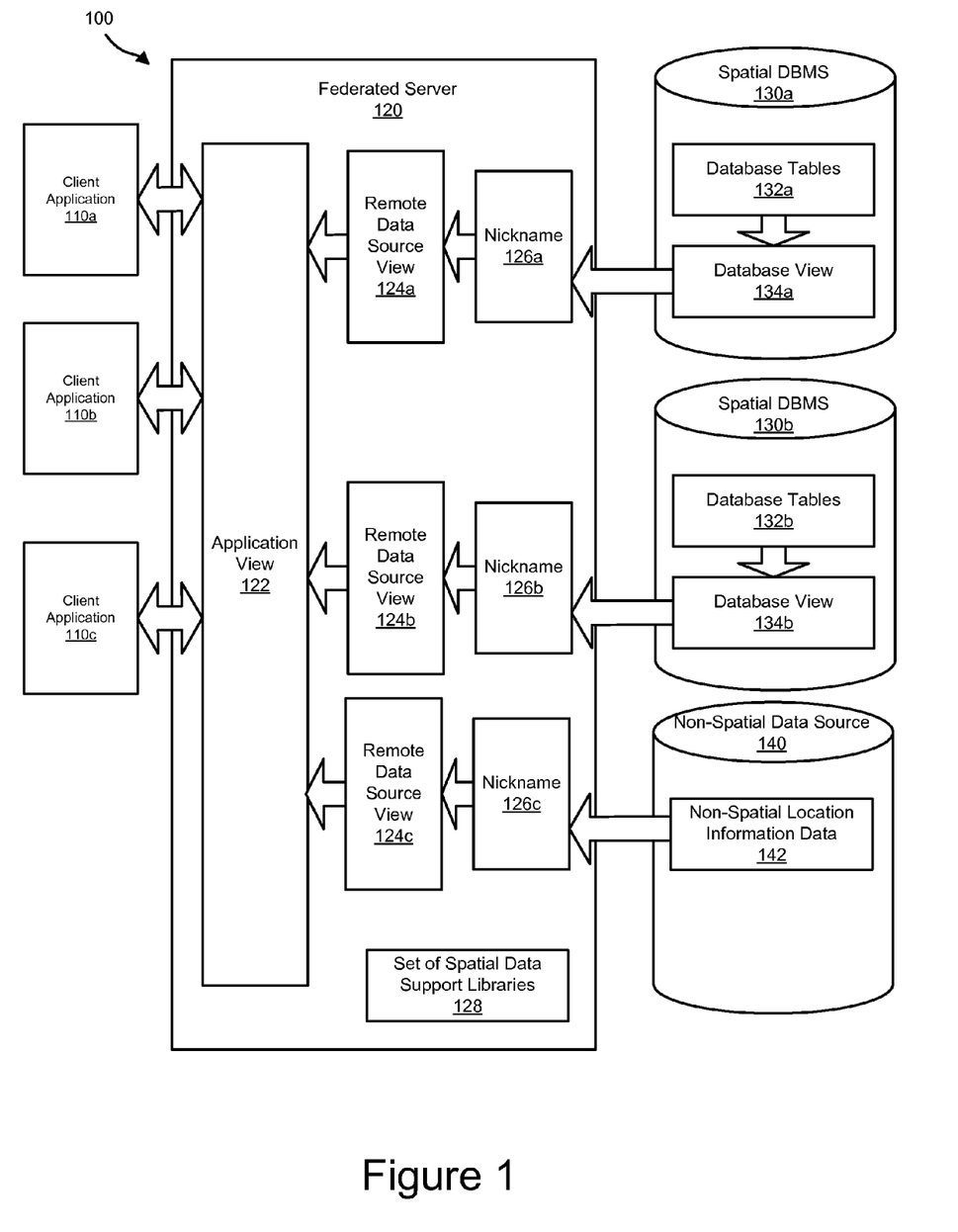
FIG. 1 is a schematic block diagram illustrating one embodiment of a system for consolidating distributed spatial data in accordance with the present invention.

FIG. 1 is a block diagram illustrating one embodiment of a system 100 for consolidating distributed spatial data in accordance with the present invention. The system 100 includes client applications 110a-c, a Federated Server 120, Spatial Databases 130a-b, and a Non-spatial Data Source 140.

Client applications 110a-c encompass a range of possible clients which are configured to submit spatial database queries to spatial data sources. In the depicted embodiment, client applications 110a-c may submit spatial database queries referencing data stored in any one of, or combination of, spatial DBMS 130a-b and non-spatial data source 140. In typical embodiments, the client applications 110a-c may then operate on the results of the query to present information to an end user. Those in the art recognize that the request may originate from other servers or other middleware as well as from the client applications 110a-c.

Federated server 120 is a federated system constituting a type of distributed database management system (DBMS). For example, IBM's WebSphere Federation Server is a well-known federated server 120. As is known to those of skill in the art, using a federated server 120, a client application 110a-c may send distributed requests to multiple data sources such as spatial DBMS 130a-b and non-spatial data source 140 within a single SQL statement. For example, a federated server 120 may allow a client application 110a to join data that is located in a DB2 table and Oracle table in a single SQL statement. The federated server 120 is configured to receive requests that might be partially or entirely intended for remote data sources and distributes the requests to the data sources.

To the client applications 110a-c, the data sources appear as a single database. Client applications 110a-c interface with a federated database (not shown) that is managed by the federated server 120. The federated system, of which the federated server 120 is a part, processes SQL statements as if the data from the data sources were ordinary relational tables or views within the federated database. Thus, if the federated server 120 is a WebSphere Federation Server, the client applications 110a-c interact with the federated server 120 as they would with any other DB2 system. The application clients 110a-c submit queries in DB2 SQL to the federated server 120, which then distributes the queries to the appropriate data sources, collects the requested data, and returns the results to the applications. Those of skill in the art will recognize, however, that a federated server 120 may not support spatial data types in their native form.

The federated server 120 further comprises nicknames 126a-c. Those of skill in the art will recognize that nicknames 126a-c are identifiers used to reference the object located at a data source that a client application 110a-c may wish to access. Nicknames 126a-c constitute pointers by which a federated server 120 references data source objects. When a client application 110a-c submits a distributed data request to the federated server 120, the request references data source objects by their nicknames which are mapped to specific objects at the data source.

Those of skill in the art will further recognize that creating a nickname 126a-c in connection with a federated server 120 may further comprise creating a wrapper object, creating a server object (also referred to as a server definition), defining user mappings, and assigning a nickname. A client setting up the federated server 120 may perform these tasks through a GUI such as the DB2 Control Center GUI in WebSphere Federation Server. Those of skill in the art will recognize that wrapper objects are mechanisms by which the federated database interacts with the data sources, allowing the federated database to connect to a data source and retrieve data from it. A user setting up the federated server 120 creates one wrapper for each type of data source (such as DB2, INFORMIX, and ORACLE).

After wrappers are created for the data sources the user setting up the federated server 120 creates the server objects by supplying a name to identify the data source and other information such as the type and version, database name, and data source-specific metadata. Defining user mapping may comprise tasks such as associating a federated server 120 authorization ID with the data source user ID and password for the various data sources such that the federated server 120 may properly access data on the data sources.

The federated server 120 further comprises remote data source views 124a-c. As recognized by those of skill in the art, in database design a view is a virtual or logical table composed of tables. A view is not a part of the physical schema of the database, but is a dynamic virtual table referencing data in the tables. Changing data in the related table changes the data in the view. Remote data source views 124a-c are created on top of the respective nicknames 126a-c. As described in greater detail below, the remote data source views 124a-c comprise spatial data represented in a spatial format such as DB2 spatial format. In one embodiment, this spatial data is derived from the well-known binary (WKB) data format stored as a binary large object (BLOB) data type referenced by a database view 134b. In another embodiment, the spatial data is derived from non-spatial location information in non-spatial data source data 142.

The federated server 120 further comprises an application view 122. An application view 122 constitutes the composite view of joined remote data source views 124a-c which is presented to the client applications 110a-c. The application view 122 is at the application layer, such that the client applications 110a-c interacting with the federated server 120 see what appears to be a unitary homogeneous data source comprising spatial data. As described above, the client applications 110a-c, through the application view 122, are able to send distributed requests to multiple data source within a single SQL statement. Thus, data is correlated and updated as if the data were stored locally on the federated database of the federated server 120.

The federated server 120 further comprises a set of spatial data support libraries 128. In a preferred embodiment, this set of spatial data support libraries is IBM's DB2 Spatial Extender. The set of spatial data support libraries 128 provides the tools necessary to store, manage, and analyze spatial data in a federated server 120. The set of spatial data support libraries 128 provides functions for converting WKB to spatial representations such as DB2 Spatial. In addition, the set of spatial data support libraries 128 provides spatial functions for converting non-spatial location information into spatial representations such as DB2 Spatial. Spatial functions include, for example, geocoding functions which convert textual address data to spatial datatypes, or point constructor functions (such as ST_Point constructor) for converting x,y coordinate data into spatial datatypes. Remote data source views 124a-c can leverage the methods and functions of the set of spatial data support libraries 128 in order to convert data referenced by the nicknames 126a-c into spatial types.

The system 100 further comprises spatial database management systems (Spatial DBMS) 130a-b. The spatial DBMS 130a-b comprise database tables 132a-b and database views 134a-b. Spatial DBMS 130a-b may be any spatial DBMS known to support spatial data and its related operations. Vendors of spatial DBMS 130a-b include IBM, Oracle, Sybase, and Microsoft. Spatial DBMS 130a-b may be of any supported brand (whether IBM, Oracle, Sybase, Microsoft, etc) and model, and the spatial DBMS 130a-b need not consist solely of a single brand.

Spatial DBMS 132a-b comprise database tables 132a-b. These database tables 132a-b further comprise a spatial column with spatial data. As explained above, a spatial column may comprise, in exemplary embodiments, point, line, or polygon data. This spatial data may be stored in a variety of formats. In many instances, the spatial data may be stored in a proprietary format unique to the particular spatial DBMS 130a-b vendor.

The spatial DBMS 130a-b further comprise a database view 134a-b. The database view 134a-b is a view (as explained above) of the database table 132a-b. In one embodiment, the database view 134a-b is created on top of the database table 132a-b and converts a spatial data column, such as the point column, into WKB stored as BLOB. Those of skill in the art will recognize that WKB is a representation format for geometric values defined by the OpenGIS specification and is used to exchange geometry data as binary streams represented by BLOB values. BLOB is a collection of binary data which is stored as a single entity in a database management system.

Those of skill in the art will further recognize that the database view 134a-b may also be implemented such that the spatial data column is converted into well-known text (WKT). Well-known text is a markup language for representing spatial data and is regulated by the Open Geospatial Consortium. Both WKB and WKT are standard canonical representations of spatial data. Additional standard canonical representations of spatial data include Shape file format and Geography Markup Language (GML). Further, those of skill in the art will recognize that a standard canonical representation of spatial data need not be implemented using BLOB. For example, text-based standards such as GML and WKT may be represented as a character large object (CLOB). References to the implantation of the present invention below which reference BLOB or a particular standard are thus illustrative of similar approaches, known to those of skill in the art, that utilize other standard canonical representations of spatial data.

The system 100 further comprises a non-spatial data source 140. The non-spatial data source 140 is a data storage medium and may comprise any of a variety of data sources (database, file, etc) comprising non-spatial location information data 142. Non-spatial location information data 142 is location information (such as an address), not in a standard spatial data datatype, from which the set of spatial data support libraries 128 can derive a representation of the location as a spatial data type (such as DB2 Spatial type or WKB). For example, non-spatial location information data 142 may comprise business data with customer information, including textual address data. Non-spatial location information data 142 may alternatively be a set of coordinates such as latitude and longitude or simply as an x-position and y-position. The set of spatial data support libraries 128 can take this textual address data and convert it to an expected spatial data type.

Figure 2:
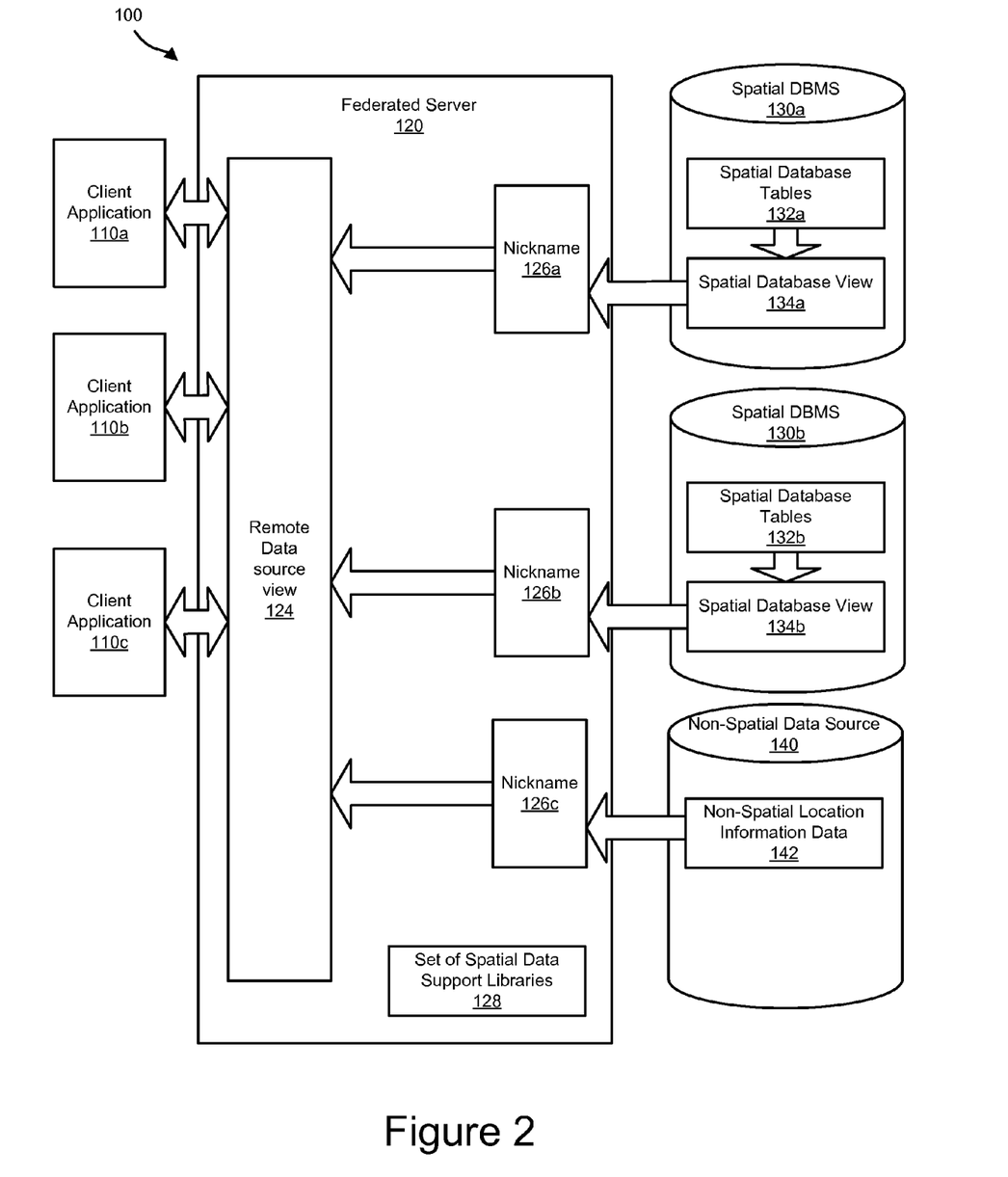
FIG. 2 is a schematic block diagram illustrating an alternative embodiment of the system for consolidating distributed spatial data in accordance with the present invention.

FIG. 2 is a schematic block diagram illustrating an alternative embodiment of the system 100 for consolidating distributed spatial data in accordance with the present invention. FIG. 2 clarifies that, in an alternative embodiment, the remote data source view 124 may comprise a view created on top of multiple nicknames 126a-c such that the remote data source view 124 constitutes a view presenting client applications 110a-c with a composite view such that the composite view appears as if all the data were stored locally in the federated database. Remote data source view 124 may in certain embodiments be a join of the tables referenced by the nicknames 126a-b such that the composite view encompasses each of the sources referenced by the nicknames.

Those of skill in the art will recognize that the depictions in FIGS. 1 and 2 are representative and are not intended to impose or imply a restriction on the number or character of the representative entities depicted. For example, the system may comprise N client applications 110, N spatial DBMS 130, and N non-spatial data source 140. Changes in the number of system members will also change the number of related system members, such as the remote data source view 124 and nickname 126 in accordance with the description above.

Figure 3:
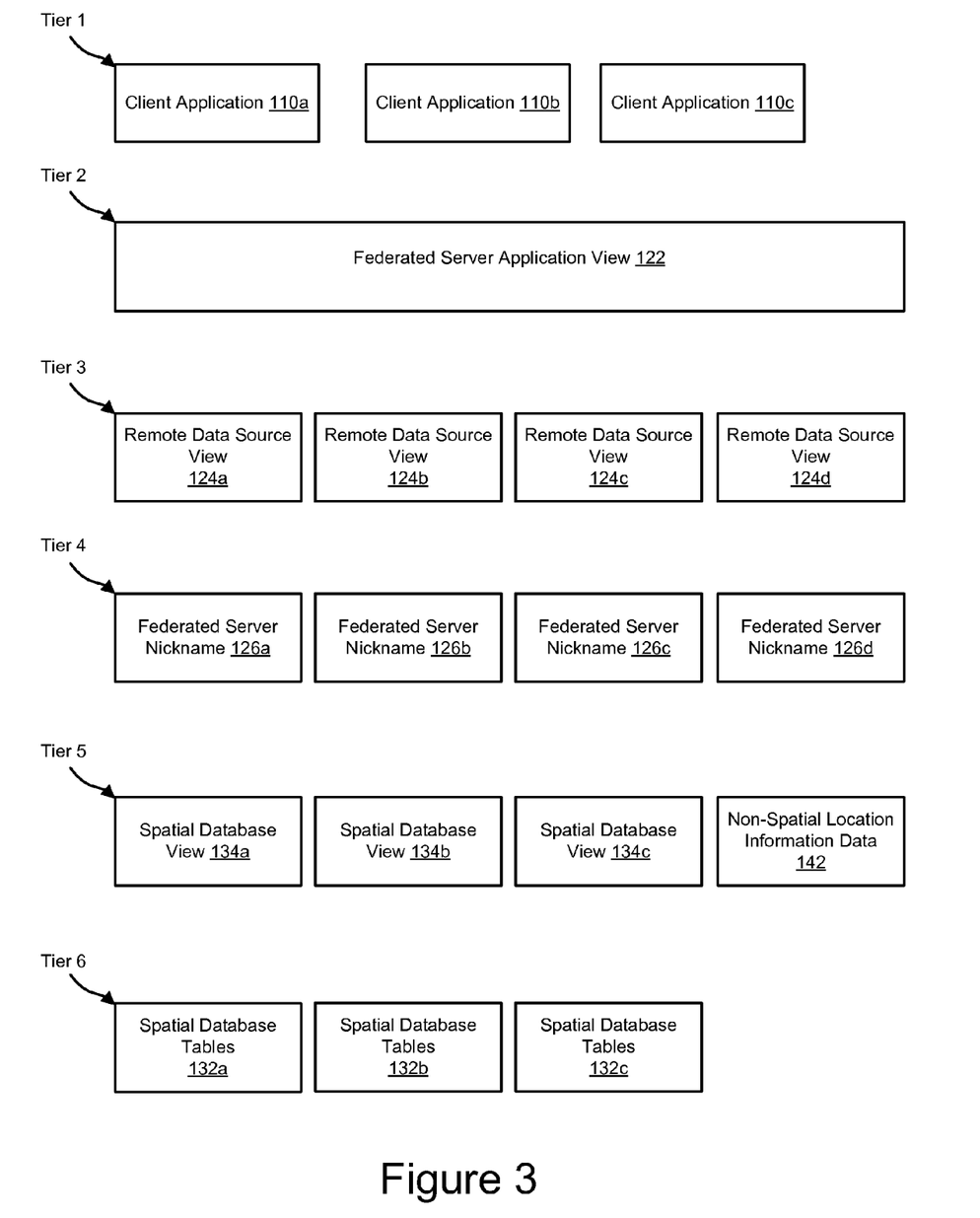
FIG. 3 is a schematic block diagram illustrating an embodiment of data structures involved in the execution of a spatial query in a distributed database environment, in accordance with the present invention.

FIG. 3 is a schematic block diagram illustrating tiers of abstraction used by embodiment of the execution of a spatial query in a distributed database environment, in accordance with the present invention. In particular, FIG. 3 emphasizes the dynamic nature of the data retrieval operation. One of the client applications 110a-c at the Tier 1 level issues a query concerning spatial data stored in a spatial database table 132a-c or concerning non-spatial location information data 142. The query is received at the Tier 2 level by the federated server 120. The federated server 120 determines an application view 122 associated with the query. As emphasized by FIG. 3, to the client application 110a-c, the data subject to a query appears to be stored locally at the federated server 120 on the Tier 2 level.

The Federated server 120 receives the query at the application view 122. As explained above, the application view 122 is a logical, or virtual table, and the data is physically stored in a related data source. The query from the client application 110a-c will reference data in the application view 122, which in turn references data in a remote data source view 124a-d at Tier 3. The remote data source view 124a-d, in turn, references a federated server nickname 126a-d at Tier 4. And as described above, the federated server nickname 126a-d is a pointer that references either a spatial database view 134a-c or non-spatial location information data 142 at Tier 5. In the case of non-spatial location information data 142, the nickname references the data as stored in a non-spatial data source 140. For a spatial database view 134a-c, the view 134a-c further references a spatial database table 132a at Tier 6, which spatial database table 132a is stored in a spatial DBMS 130a-c.

Thus, while the data at Tier 2 appears to be homogenous spatial data, Tiers 3-6 constitute the heterogeneous layers from which the application view 122 at Tier 2 is constructed. Further, the data referenced at the Application view 122 Tier 2 level is logically tied through Tiers 3-6 to the physical data itself at either the spatial database tables 132a-c at Tier 6 or the non-spatial location information data 142 at Tier 5.

In response to a request from a client application 110a-c, the view or nickname at each Tier requests from the Tier below the logically associated data. For example, suppose the client application 110a-c request requests spatial data from the application view 122 at Tier 2, which in turn requests the associated data from the remote data source view 124a at Tier 3, which requests the associated data from the nickname 126a-c at Tier 4, which requests the WKB data from the spatial database view 134a-c at Tier 5, which finally requests the spatial data from the spatial database table 132a-c at Tier 6. While this particular description explains the relationship as a 'request,' the term here is used only to indicate the logical relationship between the data and references to data at the various Tiers 1-6 such that a connection can be made from the request for spatial data at Tier 1 to the actual physical storage of the spatial data at Tiers 6 or 5. The term 'request' is not intended to limit the logical relationship to any particular structure or class of logical relationship.

Those of skill in the art will further recognize that a view may further perform operations upon the result of a data operation associated with a particular request. For example, a table may comprise data stored in imperial units of feet. A view may be created of the table which, when referenced, retrieves the data from the table in units of feet and operates on the data such that the view returns the data in units of meters. Again, the view itself is not the physical storage of data; rather, the view is a reference to the data which, in this instance, performs an operation on the data and returns the results of that operation in response to a request such as a query.

In one embodiment, the spatial data in the spatial DBMS 130a may be stored in a proprietary spatial format particular to a particular vendor such as Oracle or Microsoft. As such, the spatial data in the spatial database tables 132a-c is stored in a proprietary format that cannot be readily understood or accepted by a federated server 120. In addition, those of skill in the art will recognize that conventional federated servers do not support spatial data; as a result, an attempt to reference spatial data in a conventional federated server (by, for example, creating a nickname 126a-c pointing to the spatial database tables 132a-c) will result in an error. As such, a reference to Tier 6 directly from Tier 4 cannot be made.

In order to overcome these limitations, in accordance with the present invention, a spatial database view 134a-c is created on top of the spatial database tables 132a-c at Tier 5. The spatial database view 134a-c converts spatial data in a spatial column in a spatial database table 132a-c into WKB data format stored as BLOB data type. The majority, if not all, of spatial DBMS 130a-b provide functions to convert from a proprietary spatial data type to WKB. The spatial database view 134a-c executes this conversion function to provide spatial data in the WKB format. This function is often a proprietary database conversion function. For example, in an ORACLE Oracle DBMS, the spatial database view 134a-c may use the GET_WKB function in relation to the spatial column data. By so doing, a relationship is made between the spatial database view 134a at Tier 5 and the federated server nickname 126 at Tier 4, since the spatial column is no longer stored in a proprietary format. In addition, because the data is now simply WKB data, stored as a BLOB, the federated server 120 will accept the data as a compatible type.

With a relationship established between the nickname 126a-d at Tier 4 and the spatial database view 134a-d at Tier 5 (which process was described above), a remote data source view 124a-d is created on top of the nicknames 126a-d at Tier 3. As mentioned above, at Tier 4 the 'spatial data' is WKB data stored as BLOB. A client 110a-c does not expect WKB data in response to the query request issued at Tier 1. As such, the remote data source view 124a-d converts the WKB data into spatial data format. The set of spatial data support libraries 128 provides functions, available for use by the remote data source view 124a-d in a federated server 120, which transform WKB stored as BLOB into a spatial data type. For example, the remote data source view 124a-d may utilize a set of spatial data support libraries 128 such as DB2 Spatial Extender; in one embodiment, the remote data source view 124a-d may use the "DB2GSE.ST_GeomFromWKB" function. As such, after invocation, the data is represented in spatial format at Tier 3.

The above description dealt particularly with the case of a client application 110a-c request associated with spatial database tables 132a-c stored in a spatial DBMS 130a-b. However, a client application 110a-c request may reference non-spatial location information data 142 stored in a non-spatial data source 140. In such an embodiment, the request initiating at Tier 1 is passed through the Tiers down to the non-spatial location information data 142 at Tier 5, in a manner similar to that described above. Since the non-spatial location information data 142 is not spatial information, nor is it typically stored in a proprietary format, there is no need to create a spatial database view 134a-c over the non-spatial location information data 142.

However, there is a need to create a remote data source view 124a-d on the federated server nickname 126a-d associated with the non-spatial location information data 142. The client application 110a-c expects spatial data in response to a request, but the nickname 126a-d is associated with the non-spatial location information data 142. As a result, the remote data source view 124a-d associated with the nickname 126a-d associated with the non-spatial location information data 142 may utilize the set of spatial data support libraries 128 to convert the non-spatial location information 142 into spatial data. For example, in one embodiment, a remote data source view 124a-d may invoke a geocoding function which receives textual address data as a parameter and returns spatial data.

With both data from spatial database tables 132a-c and data from non-spatial location information data 142 represented in spatial format, a Tier 2 application view 122 may join the remote data source views 124a-d such that the client applications 110a at Tier 1 see what appears to be a homogeneous, local database at Tier 2.

Figure 4:
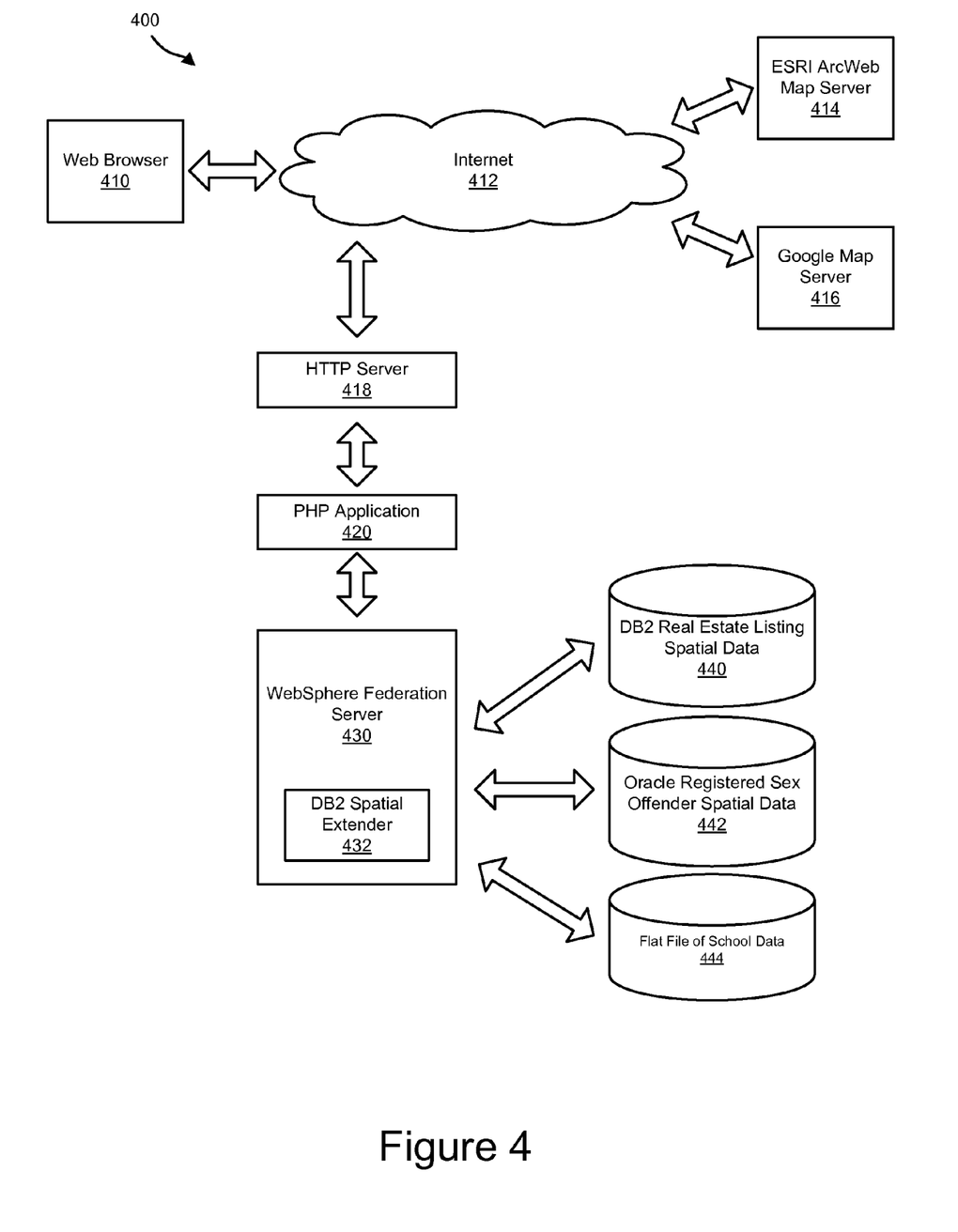
FIG. 4 is a schematic block diagram illustrating an exemplary implementation of a system for consolidating distributed spatial data in accordance with the present invention.

FIG. 4 is a schematic block diagram illustrating an exemplary implementation of a system 400 for consolidating distributed spatial data in accordance with the present invention. Those of skill in the art will recognize that the depicted embodiment is simply one of many possible configurations and, as such, should not be construed as limiting the invention to the depicted embodiment. In the depicted embodiment, a web browser 410, via the internet 412, may submit a query request for data distributed in a DB2 real estate listing spatial data 440 database, an oracle registered sex offender spatial data 442 database, and a flat file of school data 444. The data which is the subject of the query is distributed across the three data sources 440, 442, and 444, which are of heterogeneous type.

Those of skill in the art will recognize that the HTTP server 418, also commonly referred to as a web server, is responsible for accepting HTTP requests from clients, such as the web browser 410 via the internet 412, and serving them HTTP responses. Similarly, PHP Application 420 is typically deployed on an HTTP server 418 to provide dynamic functionality.

In the depicted embodiment, the federated server 120 is an IBM WebSphere Federation Server 430, and the set of spatial data support libraries 128 is IBM's DB2 Spatial Extender 432. In accordance with the present invention, and as detailed above in FIGS. 1 through 3, the client applications (in this case, PHP Application 420) interacting with the WebSphere Federation Server 430 see and interact with what appears to be a homogenous, local database comprising spatial data related to real estate listings, sex offender data, and school data. In fact, the data is not necessarily spatial (in the case of the flat file of school data 444 which comprises non-spatial location information) nor homogeneous (as each of the data sources 440, 442, and 444 are of a distinct type). By presenting the data as a local, homogenous source to the PHP Application 420, the process of interacting with the data and providing substantive results is greatly simplified, since the PHP Application 420 does not have to deal with the complexities of the disparate data formats and locations. Further, additional programs developed to make use of data sources 440, 442, 444 can take advantage of the present invention since their development and deployment will be greatly simplified as well. As a result, application development is greatly simplified, and at a much smaller cost than that which would be imposed by an ETL solution.

System 400 further shows ESRI AcrWeb Map Server 414 and GOOGLE Map Server 416. Those of skill in the art will recognize that ESRI ArcWeb Map Server 414 is a product offered to provide web-oriented spatial data services to web browsers such as web browser 410. Similarly, GOOGLE Map server 416 may be used to integrate GOOGLE map data into a web site. As such, leveraging these tools, the PHP Application 420 may present graphical map responses to a client query, via a web browser 410, relating the data found in the data sources 440, 442, and 444.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Additionally, while the discussion below makes reference to a user, the steps as described need not be executed by an individual. Some or all of the steps which reference action by a user may alternatively be implemented using a client computer system. As such, the steps are not limited to execution by a human being (user) or a system (client).

Figure 5:
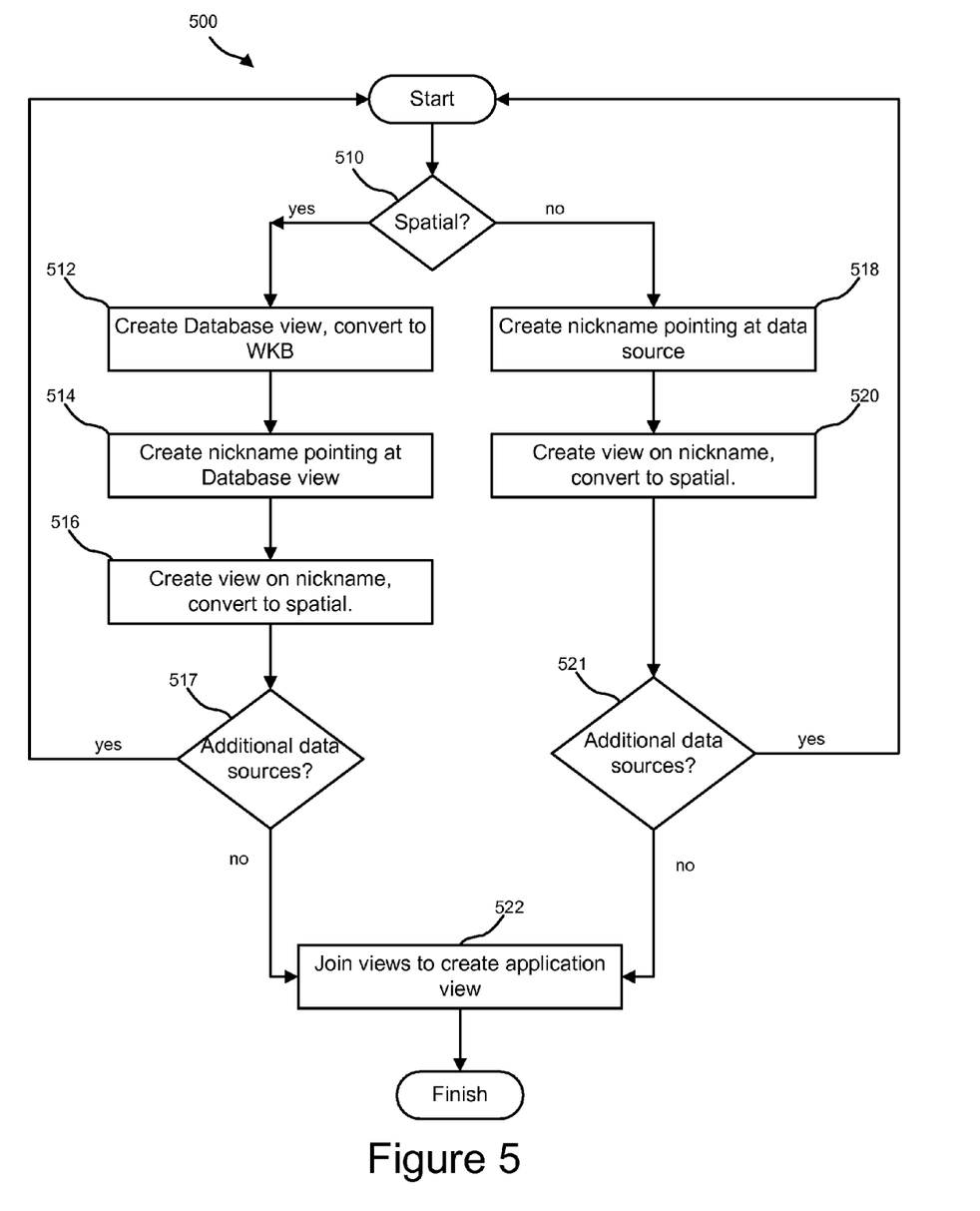
FIG. 5 is a schematic flow chart diagram illustrating one embodiment of creating a system for consolidating distributed spatial data in accordance with the present invention.

FIG. 5 is a schematic flow chart diagram illustrating one embodiment of a method 500 for creating a system for consolidating distributed spatial data in accordance with the present invention. The method 500 starts with a determination 510 by a user, such as an administrator configuring a federated server 120, whether a particular data source contains spatial data or non-spatial location information. If the data source contains spatial data, the user creates 512 a database view 134a in the spatial DBMS 130a on top of the relevant database tables 132a. The database view 134a contains logic to convert the spatial data into WKB.

The user then creates 514 a nickname 126a in a federated server 120 pointing at the database view 134a. The user then creates 516 a remote data source view 124a on top of the nickname 126a. The remote data source view 124a incorporates logic, such as that found in the set of spatial data support libraries 128, which transforms the WKB BLOB data into spatial data of a spatial data type. The user then determines 517 whether there are additional data sources, such as spatial DBMS 130b, in the system 100. If so, the user repeats the method 500 until all spatial sources are accounted for.

Once the spatial sources are accounted for, the user makes a determination 510 that there is a non-spatial data source 140 with non-spatial location information data 142. The user creates 518 a nickname 126c pointing at the non-spatial data source 140. The user also creates 520 a remote data source view 124c on top of the nickname 126c. The remote data source view 124c incorporates logic, such as that found in the set of spatial data support libraries 128, which transforms the non-spatial location information data 142 into spatial data. The user then determines 521 whether there are additional data sources. If so, the user repeats the method 500. If not, the user joins 522 the remote data source views 124a-c to create an application view 122 which presents the user applications 110a-c with what appears to be a unitary homogenous data source of spatial data.

Figure 6:
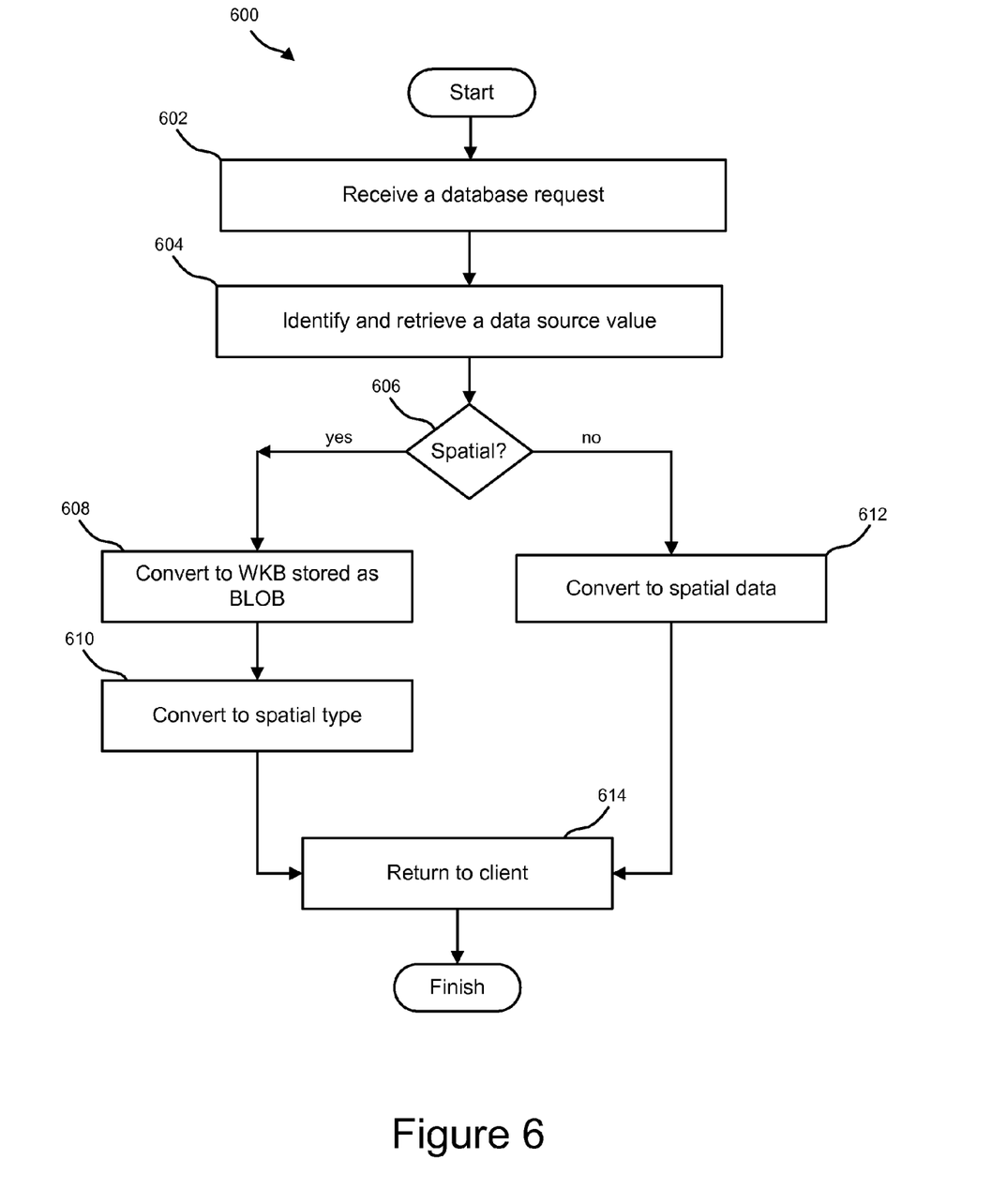
FIG. 6 is a schematic flow chart diagram illustrating one embodiment of execution of a spatial query in a distributed database environment in accordance with the present invention.

FIG. 6 is a schematic flow chart diagram illustrating one embodiment of a method 600 for execution of a spatial query in a distributed database environment in accordance with the present invention. The method 600 starts when a federated server 120 receives 602 from a client application 110a-c a spatial database request, such as a query. The federated server 120 identifies 604 and retrieves a data source value. In one embodiment, this entails associating the query with data referenced in an application view 122, associating the data referenced in the application view 122 with data referenced in a remote data source view 124a, associating that, in turn, with a nickname 126a, associating that with a spatial database view 134a, which is associated with the data itself as stored in a spatial database table 132a. In the case of non-spatial location information data 142, the nickname 126c is associated with the non-spatial location information data 142 itself, as opposed to a view 134 of that data.

When a data source value stored in a database table 132a-b or non-spatial location information data 142 is identified and retrieved, the data will be either 606 spatial or non-spatial location information data 142. If the data is spatial, the database view 134a retrieves the data from a database table 132a and, invoking a function available as part of the spatial DBMS 130a, converts 608 the data from spatial data in spatial format to WKB data in BLOB format. When the WKB data in BLOB format is passed to the remote data source view 124a, the remote data source view 124a invokes a function of the set of spatial data support libraries 128 to convert 610 the WKB data to spatial data in a spatial format. The spatial data in spatial format is then returned 614 to the client application 110a-c.

If the data at 606 is non-spatial location information data 142, the data, when passed from the nickname 126c to the remote data source view 124c is converted 612 from non-spatial location information data 142 to spatial data in spatial format. This conversion is made by the remote data source view 124c invoking a spatial function of the set of spatial data support libraries 128, which function takes textual location information (such as an address) and converts it to spatial data of a spatial type. For example, if the non-spatial location information data 142 is textual address data, the remote data source view 124c may invoke a geocoding function. Alternatively, where the non-spatial location information data 142 is given as x and y coordinates, the spatial function may be an ST_Point construction function. This spatial data of a spatial data type is returned 614 to the client.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for executing a spatial data query in a distributed heterogeneous data source environment, the method comprising:
creating a nickname, in a federated server, for a database comprising spatial data and associating the nickname with a database view in the database, wherein the database view is configured to convert the spatial data to a non-spatial representation supported by the federated server;
creating a remote data source view of the nickname in the federated server;
configuring the remote data source view to convert the non-spatial representation to converted spatial data in a spatial format using one or more functions of a spatial data support library for the federated server; and
joining one or more remote data source views into a composite view, the composite view defining an application view.

2. The method of claim 1, wherein creating the database view in the database comprises applying a proprietary database conversion function to convert the spatial data in proprietary form into a non-spatial representation that is well known binary (WKB) in response to a determination that the database comprises spatial data represented in a proprietary form.

3. The method of claim 1, wherein creating the nickname for the database view further comprises:
creating a wrapper object;
creating a server object;
defining user mapping; and
assigning the nickname.

4. The method of claim 1, wherein converting the non-spatial representation to the converted spatial data comprises invoking a DB2GSE.ST_GeomFromWKB function.

5. The method of claim 1, wherein the spatial data in the database is one of well-known binary (WKB), Shape, geography markup language (GML), and well-known text (WKT).

6. The method of claim 1, wherein the converted spatial data in a spatial format is a DB2 spatial type.

7. The method of claim 1, further comprising:
creating a second nickname in the federated server for a remote data source comprising non-spatial location information;
invoking a spatial function from the spatial data support library, the spatial function configured to convert the non-spatial location information to spatial data; and
creating a remote data source view of the nickname in the federated server, the remote data source view comprising spatial data derived from the non-spatial location information.

8. A method for executing a spatial data query in a distributed heterogeneous data source environment, the method comprising:
receiving a database request from a client of a federated server aggregating a plurality of databases comprising spatial data, wherein a database table in at least one of the plurality of databases associated with the database request comprises spatial data;
invoking a function in the at least one database to convert the spatial data in a spatial column, the spatial data represented in spatial format, to a non-spatial representation supported by the federated server;
invoking a function of a spatial data support library for the federated server to convert the non-spatial representation to converted spatial data represented in a spatial format; and returning to the client the results of the database request, including the converted spatial data in the spatial format.

9. The method of claim 8, wherein a remote data source view defines the converted spatial data, and wherein the remote data source view is associated with one or more nicknames.

10. The method of claim 8, further comprising executing a spatial join of one or more remote data source views, a view resulting from the spatial join defining an application view.

11. The method of claim 9 further comprising:
the database request requesting spatial data from the remote data source view;
the remote data source view requesting spatial data from one of the one or more nicknames;
the nickname requesting the non-spatial representation data from a database view; and
the database view requesting spatial data from the database table, the spatial data in the database table stored in a proprietary format.

12. The method of claim 8, wherein the database request from the client references a data source comprising non-spatial location information, the method further comprising:
invoking a function in the federated server to convert the non-spatial location information referenced by a nickname to spatial data such that the remote data source view comprises a spatial column of non-spatial location information as spatial data; and
returning to the client the results of the database request, the non-spatial location information associated with the database request referencing spatial data.

13. The method of claim 12, wherein the function to operate on the non-spatial location information is a geocoding function and the non-spatial location information is textual address data.

14. The method of claim 12, further comprising:
the database request requesting spatial data from the remote data source view; and
the remote data source view requesting spatial data from a data source referenced by the nickname, the data source comprising non-spatial location information.

* * * * *